United States Patent
Hoffmann et al.

(10) Patent No.: US 6,472,796 B1
(45) Date of Patent: Oct. 29, 2002

(54) METHOD AND APPARATUS FOR CONTROLLING A CAPACITIVE ACTUATOR

(75) Inventors: Christian Hoffmann, Regensburg; Hellmut Freudenberg, Grossberg; Hartmut Gerken, Nittendorf; Martin Hecker, Laimerstadt; Richard Pirkl, Regensburg, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/513,623

(22) Filed: Feb. 25, 2000

Related U.S. Application Data

(63) Continuation of application No. PCT/DE99/01856, filed on Jun. 25, 1999.

(30) Foreign Application Priority Data

Jun. 25, 1998 (DE) .......................... 198 28 401

(51) Int. Cl.[7] .......................... H01L 41/08; F02M 39/00
(52) U.S. Cl. .......................... 310/316.03; 310/316.01; 123/447
(58) Field of Search ....................... 310/316.03, 316.02, 310/316.01, 317, 319; 123/446, 447, 456, 467, 498, 500, 501

(56) References Cited

U.S. PATENT DOCUMENTS

| | | | |
|---|---|---|---|
| 3,589,345 A | * | 6/1971 | Benson .............. 310/316.03 X |
| 4,767,959 A | * | 8/1988 | Sakakibara et al. ......... 310/317 |
| 4,784,102 A | * | 11/1988 | Igashira et al. ............. 123/447 |
| 5,097,171 A | | 3/1992 | Matsunaga et al. |
| 5,130,598 A | * | 7/1992 | Verheyen et al. ...... 310/316.03 |
| 5,376,854 A | | 12/1994 | Oouchi |
| 5,499,541 A | | 3/1996 | Hopf et al. |
| 5,578,761 A | | 11/1996 | Clark, Jr. et al. |
| 6,385,500 B1 | * | 5/2002 | Hebbar et al. ...... 310/316.03 X |

FOREIGN PATENT DOCUMENTS

| | | |
|---|---|---|
| DE | 196 44 521 A1 | 4/1998 |
| DE | 198 04 196 A1 | 8/1999 |

* cited by examiner

*Primary Examiner*—Mark O. Budd
(74) *Attorney, Agent, or Firm*—Laurence A. Greenberg; Werner H. Stemer; Ralph E. Locher

(57) ABSTRACT

A method for controlling a capacitive actuator includes the steps of determining an energy applied to an actuator, measuring an actuator voltage present at the actuator, and inferring a functional state of the actuator by using the energy and the actuator voltage. A capacitive actuator is fed energy and the actuator voltage present at the actuator is measured. The energy and the comparison of the actuator voltage with reference values are used to infer a functional state, for example, either faults or correct function of the actuator or injection valve. Furthermore, the actuator voltage is used to infer an actuator stroke. The method is based on actuator characteristics. The invention also includes a circuit for controlling a capacitive actuator having a driving circuit with a main switch, a charging capacitor, a first series circuit including an oscillating coil, an auxiliary switch, and a second series circuit having a discharging switch, a charging switch, and a diode to be connected to the actuator, and a control device having a program and a family of characteristics with actuator characteristics defining characteristic curves, reference values, and correction factors.

15 Claims, 3 Drawing Sheets

METHOD AND APPARATUS FOR CONTROLLING A CAPACITIVE ACTUATOR

CROSS-REFERENCE TO RELATED APPLICATION

This application is a continuation of copending International Application No. PCT/DE99/01856, filed Jun. 25, 1999, which designated the United States.

BACKGROUND OF THE INVENTION

Field of the Invention

The invention lies in the field of electronics. The invention relates to a method for controlling a capacitive actuator, in particular a piezoelectric actuator for a fuel injection valve, and an apparatus for carrying out the method.

A method and a configuration for carrying out a related method are described in German Published, Non-Prosecuted Patent Application DE 196 44 521 A1, corresponding to U.S. Application No. 09/299,367, filed Apr. 26, 1999. In that method, a predetermined energy is fed to a capacitive actuator. The feeding takes place by defined charge transfer of a charging capacitor to the actuator, the charging capacitor being discharged from an initial voltage value to a final voltage value. Alternatively, the energy applied to the actuator is determined by measuring the values of the current and voltage flowing or present at the actuator.

SUMMARY OF THE INVENTION

It is accordingly an object of the invention to provide a method and apparatus for controlling a capacitive actuator that overcomes the hereinafore-mentioned disadvantages of the heretofore-known devices and methods of this general type and that controls a capacitive actuator to diagnose the functional state of an actuator or a fuel injection valve.

With the foregoing and other objects in view, there is provided, in accordance with the invention, a method for controlling a capacitive actuator, including the steps of determining an energy applied to an actuator, measuring an actuator voltage present at the actuator, and inferring a functional state of the actuator by using the energy and the actuator voltage.

One advantage of the invention is that a functional state of an actuator is quickly and reliably detected in a simple way. The method according to the invention also enables distinguishing between different fault types, for example, a fuel injection valve that no longer opens or closes.

In accordance with another mode of the invention, the inferring step is performed by inferring a functional state of the actuator by using the energy and a deviation of the actuator voltage from at least one reference value.

The invention is based on the idea of inferring the actuator deflection, and, consequently, the functional state of the actuator or the fuel injection valve, from an energy value applied to the actuator and an actuator voltage measured at the actuator.

In accordance with a further mode of the invention, there is provided the steps of inferring a correct functional state of the actuator when an actuator voltage lies between a lower reference value and an upper reference value, inferring a first type of fault when an actuator voltage falls below the lower reference value, and inferring a second type of fault when the actuator voltage exceeds the upper reference value.

In accordance with an added mode of the invention, there is provided the steps of determining a plurality of values for the energy and the associated actuator voltage and inferring a functional state of the actuator by using the plurality of values.

In accordance with an additional mode of the invention, there is provided the step of changing at least one reference value in dependence upon an actuator temperature.

In accordance with yet another mode of the invention, there is provided the steps of sensing operating points of the actuator that are associated with a type of fault, and determining at least one reference value by using the operating points.

In accordance with yet a further mode of the invention, the inferring step is performed by inferring a functional state of the actuator by using at least one measured variable.

In accordance with yet an added mode of the invention, the at least one measured variable is an intrinsic noise of an internal combustion engine.

In accordance with yet an additional mode of the invention, there is provided the step of inferring an actuator stroke by using the energy and the actuator voltage.

With the objects of the invention in view, there is also provided a method for controlling a capacitive actuator, including the steps of determining an energy applied to an actuator, measuring an actuator voltage present at the actuator, and inferring an actuator stroke by using the energy and the actuator voltage.

With the objects of the invention in view, there is further provided a method for controlling a piezoelectric actuator for a fuel injection valve of an internal combustion engine, including the steps of determining an energy applied to an actuator, measuring an actuator voltage present at the actuator, and inferring a functional state of the actuator by using the energy and the actuator voltage.

With the objects of the invention in view, there is additionally provided a circuit for controlling a capacitive actuator, the circuit including a driving circuit having a main switch, a charging capacitor connected to an energy source through the main switch, a first series circuit parallel to the charging capacitor, the first series circuit including an oscillating coil connected to the main switch, an auxiliary switch, and a second series circuit parallel to the auxiliary switch, the second series circuit having a parallel circuit including a discharging switch and a charging switch, and another circuit including a diode to be connected in parallel to the actuator conducting in a direction to ground, and a control device for driving the driving circuit, the control device receiving input signals and having a program and a family of characteristics with actuator characteristics defining characteristic curves, reference values, and correction factors compensating for temperature and for losses of the driving circuit, the control device controlling the main switch, the auxiliary switch, the charging switch, and the discharging switch with the program dependent upon the input signals and upon the characteristic curves of the family of characteristics, the input signals including at least one of the actuator voltage, the actuator temperature, at least one measured variable, and a driving signal.

In accordance with a concomitant feature of the invention, the circuit for controlling a capacitive actuator controls a piezoelectric actuator for a fuel injection valve of an internal combustion engine.

Other modes and features that are considered as characteristic for the invention are set forth in the appended claims.

Although the invention is illustrated and described herein as embodied in a method and apparatus for controlling a capacitive actuator, it is nevertheless not intended to be limited to the details shown, because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
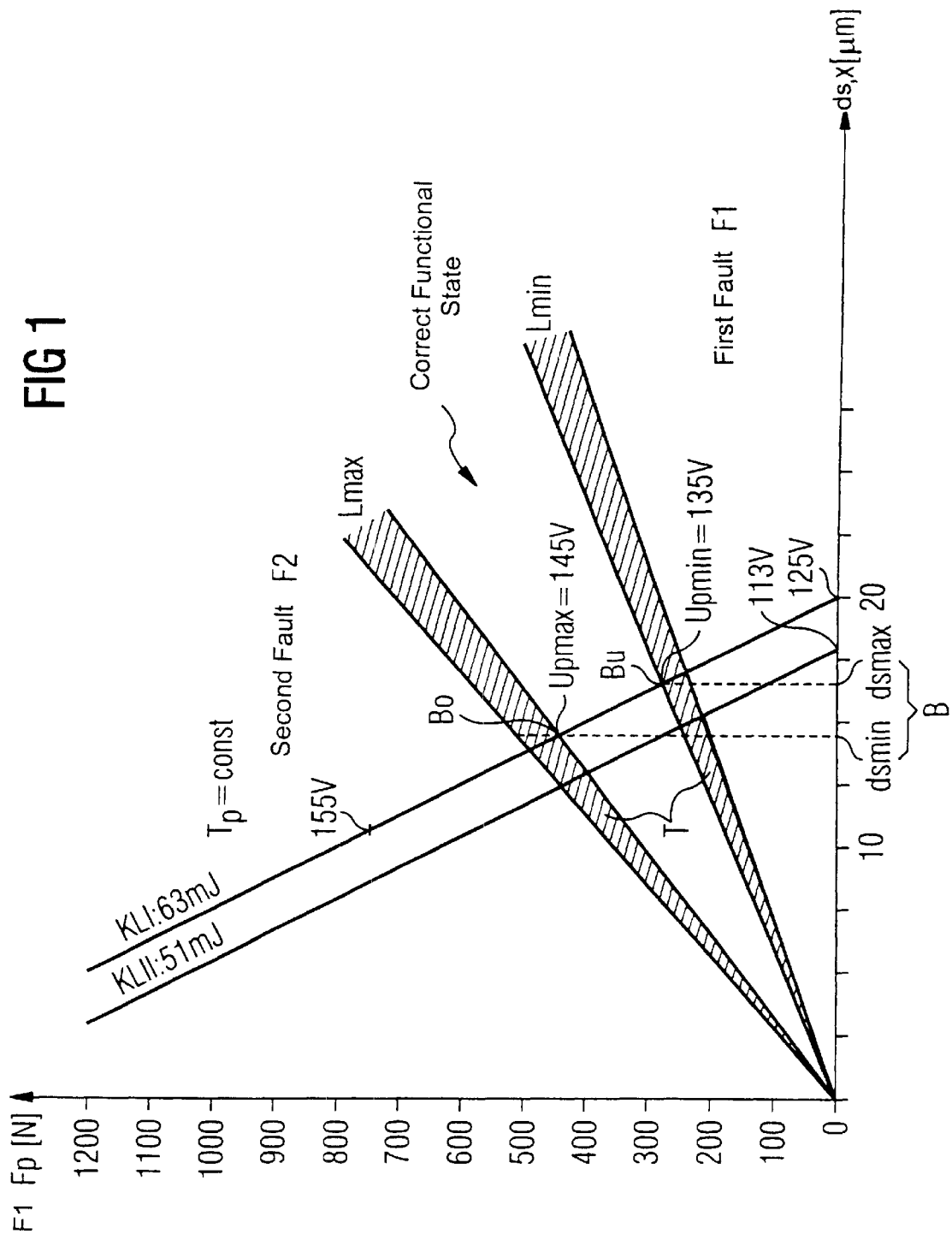
FIG. 1 is a graph of actuator characteristics according to the invention.

In all the figures of the drawing, sub-features and integral parts that correspond to one another bear the same reference symbol in each case.

Referring now to the figures of the drawings in detail and first, particularly to FIG. 1 thereof, there is shown a graph with actuator characteristics and load lines. Plotted on the y-axis are an actuator force Fp, generated by an actuator P, and a loading force Fl, acting on a load body. An exemplary embodiment of a load body is, for example, a nozzle needle of a fuel injection valve that is driven by an actuator P. Plotted on the x-axis is an actuator stroke ds of an actuator P and a load deflection x, by which a load body is deflected by the loading force Fl acting on it.

Each of the load lines represented as passing through the origin, for example, Lmin and Lmax, shows a linear dependence of the load deflection x on the loading force Fl, each load body being characterized by its body shape and its resilient properties, for example, a hollow-cylindrical metal body with a predetermined modulus of elasticity. For other exemplary embodiments of the load bodies, non-linear dependencies occur, for example, where load bodies have a plurality of bodies with different moduli of elasticity laminated one on top of the other. The plurality of bodies act like springs with different spring constants connected in series or, for example, dynamic moving load bodies.

The actuator P and the load body are mechanically coupled to each other. Consequently, the point of intersection of a load line with an actuator characteristic defines an operating point of the actuator P.

Each of the actuator characteristics KL I and KL II shows the dependence typical for a piezoelectric actuator P of the actuator force Fp on the actuator stroke ds when there is a predetermined energy E fed to the actuator P. The characteristic KL I has in the exemplary embodiment 63 mJ, and the characteristic KL II has 51 mJ. The actuator voltage Up, measured at the actuator P, is dependent upon the actuator stroke ds and the actuator force Fp. With an energy applied to the actuator of E=63 mJ and a measured actuator voltage of Up=125 V, for example, the actuator P has an actuator stroke of ds=20 $\mu$m and an actuator force of Fp=0 N, as the characteristic KL I indicates.

The invention applies the characteristics represented by way of example in the graph of FIG. 1. A correct functional state of the actuator Poor the fuel injection valve is inferred if the actuator stroke ds lies in a predetermined band B with a lower reference value Bu and an upper reference value Bo as the upper and lower limits of the band B. The limits of the band correspond, for example, to the minimum stroke dsmin permissible in the fuel injection valve or to the maximum permissible stroke dsmax. If the actuator stroke ds lies outside the band B, a fault of a first type of fault F1 (ds>dsmax) or a fault of a second type of fault F2 (ds<dsmin) is inferred. The actuator stroke ds is determined from the measured actuator voltage Up from one of the predetermined actuator characteristics.

The reference values Bu and Bo represent operating points of the actuator P and are determined by theoretically or experimentally simulating loading forces Fl usually occurring for the types of fault, and by assigning reference values to the operating points of the actuator P thus determined.

The region of the limits of the band B has a tolerance range T, in which the functional state cannot be detected reliably. To ensure a reliable diagnosis of the functional state, the limits of the band B are chosen such that a correct functional state is ensured within the band B. If an actuator stroke ds is determined to lie outside the band B in the tolerance range T, additional measured variables M concerning the operating state are recorded, for example, engine noises, which together with the actuator stroke ds permit a reliable determination of the functional state.

Subdividing the fault types into a first type F1, a second type F2, and further fault types permits a broad classification of the types of fault occurring in a fuel injection valve. In an exemplary embodiment, the first type of fault F1 indicates a rupture of an actuator spring and the second type of fault F2 indicates a jamming of the mechanics connected to the actuator P. Subdividing into further fault types is achieved by respective assignment of additional fault types to one or more reference values characterizing that type of fault.

Figure 2:
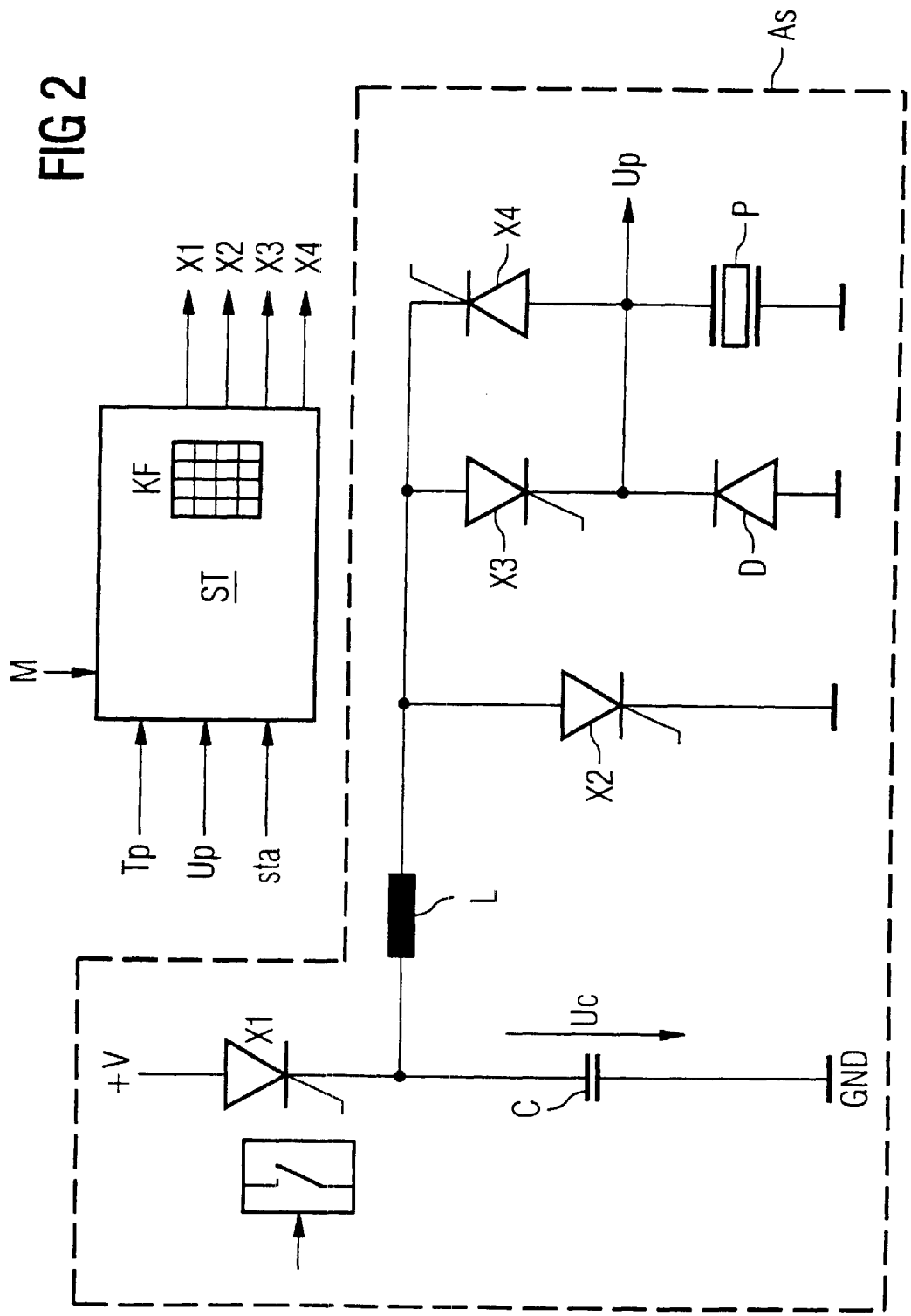
FIG. 2 is a schematic and block diagram of an exemplary configuration according to the invention.

The actuator characteristics, reference values, and corresponding fault types required for the method according to the invention are determined experimentally, for example on an engine test bed, and are stored as a family of characteristics KF in a control device ST (FIG. 2).

Alternatively, the behavior of the piezoelectric actuator may be represented by approximation in a model, in which:

$$ds=f(k,E,Up)$$

ds being the actuator stroke of the actuator P;
E being the energy applied to the actuator P;
Up being the actuator voltage measured at the actuator; and
k being an actuator constant that describes the mechanical and electrical properties of the actuator.

In addition, the losses occurring in the configuration for controlling an actuator according to FIG. 2 are measured in the components, and corresponding correction factors to compensate for the losses are determined and stored in the family of characteristics KF.

The behavior of the actuator P represented in the actuator characteristics changes when there is a change in the actuator temperature Tp because a piezoelectric actuator P has temperature-dependent properties. Temperature compensation takes place by adapting the reference values by correction factors that are stored. in the family of characteristics KF.

Figure 3:
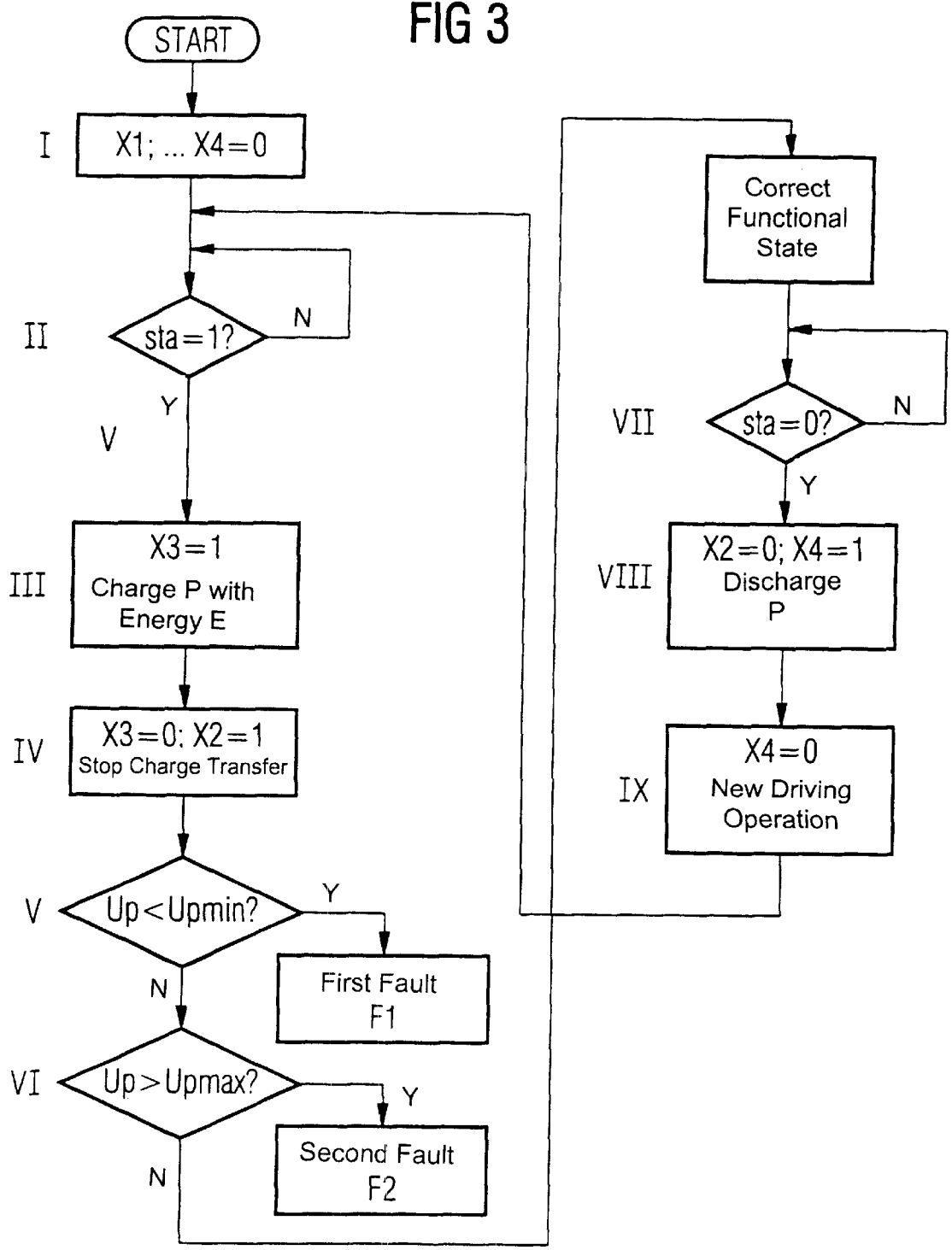
FIG. 3 is a flow diagram of the operation mode of the configuration according to FIG. 2.

The family of characteristics KF serves in a control operation according to FIG. 3 as a database for carrying out the method according to the invention.

Represented in FIG. 2 are a configuration for controlling a capacitive actuator P with a control device ST and a driving circuit according to the method shown in FIG. 3. It is possible for the control device ST to be part of a non-illustrated microprocessor-controlled engine control device.

The driving circuit As has a charging capacitor C that is connected to an energy source V through a main switch X1, lying at a positive terminal +. Parallel to the capacitor C there is a series connection including an oscillating or ring-around coil L, connected to the main switch XI, and an auxiliary switch X2, connected to the negative terminal GND. Parallel to the auxiliary switch X2 is a series connection including a parallel connection of a discharging switch X4, conducting toward the oscillating coil L, and a charging switch X3, conducting away from the oscillating coil L, and a parallel connection of the actuator P with a diode D, the actuator P conducting in the direction of the terminal GND.

The control device ST has a family of characteristics KF with actuator characteristics and with correction factors to compensate for temperature-dependent changes of the actuator behavior and to compensate for the losses in the driving circuit As. The control device ST controls the switches X1 to X4 through an internally running program dependent on input signals with working steps described in FIG. 3. The control device ST is fed input signals including, for example, the actuator voltage Up, a driving signal sta, the measured variables M, and the actuator temperature Tp, determined, for example, by a temperature sensor.

A driving operation running in the configuration according to FIG. 2 is described in the flow diagram shown in FIG. 3. The driving operation starts from an initial state (state I), in which all the switches X1 to X4 are non-conducting (symbolized in the flow diagram by X1 to X4=0) and the oscillating coil L is de-energized.

The beginning of the control signal sta=1 (state II) initiates a driving operation that charges the actuator P with a predetermined energy E (state III). To charge the actuator P. for example, the charging capacitor C, charged to a maximum voltage, has its charge transferred through the oscillating coil L to the actuator P until a minimum voltage is achieved. Then, the charge-transfer operation ends (state IV). The actuator voltage Up is then measured. Accordingly, deviation of the actuator voltage Up from reference values Upmin and Upmax can be used to infer the functional state of the actuator P or the fuel injection valve. If the actuator voltage Up falls below the minimum reference value Upmin or exceeds the maximum reference value Upmax, the first type of fault F1 (state V) or the second type of fault F2 (state VI) is inferred, respectively. If the actuator voltage Up lies between the reference values Upmin and Upmax, a correct functional state is inferred. With the end of the control signal sta=0 (state VII), the actuator P is discharged (state VIII). Thereafter, the actuator P is ready for a new driving operation (state IX).

In a further embodiment of the invention, the momentary energy E and the corresponding actuator voltage Up are measured continuously, or at least at a number of points in time, during the charge-transfer operation and/or the discharging operation. The energy E may be determined, for example, by measuring the capacitor voltage Uc or by multiplication of the value of the current flowing through the actuator P by the value of the actuator voltage Up, and integrating the result of multiplication over the time of the charging or discharging operation. A plurality of measurements of the energy E and the actuator voltage Up advantageously permit a quick and differentiated determination of the functional state.

In addition, it is possible to measure the actuator voltage Up after the discharging operation of the actuator P (state VIII). If the actuator voltage Up exceeds a further reference value, a further type of fault is inferred, for example, a jamming of the actuator P in the deflected state. Jamming of the actuator P in the deflected state is inferred because the discharging operation is too short to carry out completely the internal charge-transfer operations in the still-deflected high-impedance actuator P. Therefore, a residual voltage remains on the actuator P.

The temperature dependence of the actuator P is compensated by changing the lower reference value Bu and the upper reference value Bo, or other reference values, based upon the correction factors stored in the family of characteristics KF of the control device ST.

The actuator P controls the supply of fuel in a fuel injection valve distributed into the combustion chamber of the internal combustion engine. Consequently, the method described above and the configuration for carrying out the method advantageously also undertake the diagnostic functions during the operation of an internal combustion engine during each injection operation, enabling quick initiation of suitable countermeasures in the event of a fault. For example, if the first fault case F1 has the result that the valve no longer closes and fuel flows continuously into the combustion chamber. By switching off the fuel supply to the cylinder with the faulty fuel injection valve, or by switching off a number of cylinders to maintain engine running at a low-vibration, damage to the engine can be averted and the vehicle can reach the nearest workshop under its own power.

To optimize the injection operations in a fuel injection valve, for example, in the development or test phase, the method according to the invention is used to draw advantageous conclusions concerning the internal processes during a driving operation. Furthermore, the method can be used in production at the end of the production line for final control purposes.

The method according to the invention can also be used in other applications, for example, for diagnosing the functional state in piezoelectric servomotors.

We claim:

1. A method for controlling a capacitive actuator, which comprises:
    determining an energy applied to an actuator;
    measuring an actuator voltage present at the actuator; and
    inferring a functional state of the actuator by using the energy and the actuator voltage.

2. The method according to claim 1, wherein the inferring step is performed by inferring a functional state of the actuator by using the energy and a deviation of the actuator voltage from at least one reference value.

3. The method according to claim 1, which comprises:
    inferring a correct functional state of the actuator when an actuator voltage lies between a lower reference value and an upper reference value;
    inferring a first type of fault when an actuator voltage falls below the lower reference value; and inferring a second type of fault when the actuator voltage exceeds the upper reference value.

4. The method according to claim 1, which comprises determining a plurality of values for the energy and the associated actuator voltage and inferring a functional state of the actuator by using the plurality of values.

5. The method according to claim 2, which comprises changing the at least one reference values in dependence upon an actuator temperature.

6. The method according to claim 3, which comprises changing the lower reference value and the upper reference value in dependence upon an actuator temperature.

7. The method according to claim 1, which comprises:
sensing operating points of the actuator associated with a type of fault; and
determining at least one reference value by using the operating points.

8. The method according to claim 1, which comprises:
sensing operating points of the actuator associated with a type of fault; and
determining a lower reference value and an upper reference value by using the operating points.

9. The method according to claim 1, wherein the inferring step is performed by inferring a functional state of the actuator by using at least one measured variable.

10. The method according to claim 9, wherein the at least one measured variable is an intrinsic noise of an internal combustion engine.

11. The method according to claim 1, which comprises inferring an actuator stroke by using the energy and the actuator voltage.

12. A method for controlling a capacitive actuator, which comprises:
determining an energy applied to an actuator;
measuring an actuator voltage present at the actuator; and
inferring an actuator stroke by using the energy and the actuator voltage.

13. A method for controlling a piezoelectric actuator for a fuel injection valve of an internal combustion engine, which comprises:
determining an energy applied to an actuator;
measuring an actuator voltage present at the actuator; and
inferring a functional state of the actuator by using the energy and the actuator voltage.

14. A circuit for controlling a capacitive actuator, the circuit comprising:
a driving circuit having:
a main switch;
a charging capacitor connected to an energy source through said main switch;
a first series circuit parallel to said charging capacitor, said first series circuit including:
an oscillating coil connected to said main switch;
an auxiliary switch; and
a second series circuit parallel to said auxiliary switch, said second series circuit having:
a parallel circuit including a discharging switch and a charging switch, and
another circuit including a diode to be connected in parallel to the actuator conducting in a direction to ground; and a control device for driving said driving circuit, said control device receiving input signals and having a program and a family of characteristics with:
actuator characteristics defining characteristic curves;
reference values; and
correction factors compensating for temperature and for losses of said driving circuit,
said control device controlling said main switch, said auxiliary switch, said charging switch, and said discharging switch with said program dependent upon the input signals and upon said characteristic curves of said family of characteristics, the input signals including at least one of:
actuator voltage;
actuator temperature;
at least one measured variable; and
a driving signal.

15. A configuration for controlling a piezoelectric actuator for a fuel injection valve of an internal combustion engine, comprising:
a driving circuit having:
a main switch;
a charging capacitor connected to an energy source through said main switch;
a first series circuit parallel to said charging capacitor, said first series circuit including:
an oscillating coil connected to said main switch;
an auxiliary switch; and
a second series circuit parallel to said auxiliary switch, said second series circuit having:
a parallel circuit including a discharging switch and a charging switch, and
another circuit including a diode to be connected in parallel to the actuator conducting in a direction to ground; and
a control device for driving said driving circuit, said control device receiving input signals and having a program and a family of characteristics with:
actuator characteristics defining characteristic curves;
reference values; and correction factors compensating for temperature and for losses of said driving circuit,
said control device controlling said main switch, said auxiliary switch, said charging switch, and said discharging switch with said program dependent upon the input signals and upon said characteristic curves of said family of characteristics, the input signals including at least one of:
actuator voltage;
actuator temperature;
at least one measured variable; and
a driving signal.

* * * * *